US011651054B2

(12) United States Patent
Shetty et al.

(10) Patent No.: US 11,651,054 B2
(45) Date of Patent: May 16, 2023

(54) INTELLIGENT WORKFLOWS ON A USER DEVICE

(71) Applicant: VMWARE, INC., Palo Alto, CA (US)

(72) Inventors: Rohit Pradeep Shetty, Bangalore (IN); Ramani Panchapakesan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 348 days.

(21) Appl. No.: 17/106,477

(22) Filed: Nov. 30, 2020

(65) Prior Publication Data

US 2022/0172006 A1  Jun. 2, 2022

(51) Int. Cl.
*G06K 9/62* (2022.01)
*H04L 9/32* (2006.01)
*G06V 30/224* (2022.01)

(52) U.S. Cl.
CPC ......... *G06K 9/6267* (2013.01); *G06V 30/224* (2022.01); *H04L 9/3213* (2013.01)

(58) Field of Classification Search
CPC ...... G06F 16/955; G06F 40/284; G06F 40/40; G06F 16/285; G06F 16/3344; G06F 40/205; G06F 40/30; G06F 16/24522; G06F 16/24578; G06F 16/24575; G06F 16/284; G06F 16/3329; G06F 16/3332; G06F 16/3334; G06F 16/367; G06F 16/90324; G06F 16/951; G06F 16/9535; G06F 40/211; G06F 11/079; G06N 20/00; G06N 5/022; G06N 7/005; G06N 5/046; G06N 3/088
See application file for complete search history.

(56) References Cited

U.S. PATENT DOCUMENTS

| | | | | |
|---|---|---|---|---|
| 2008/0133572 A1* | 6/2008 | Verhey-Henke | ....... | G16H 10/20 707/999.102 |
| 2013/0088337 A1* | 4/2013 | Blanchflower | .. | H04N 21/25841 340/384.1 |
| 2013/0301884 A1* | 11/2013 | Lyons | ................. | G07F 17/3206 235/382 |
| 2018/0114334 A1* | 4/2018 | Desai | ................... | G06K 9/6271 |
| 2021/0319872 A1* | 10/2021 | Valentine | ............... | G16H 10/60 |

* cited by examiner

*Primary Examiner* — Alex Kok S Liew
(74) *Attorney, Agent, or Firm* — Clayton, McKay & Bailey, PC (57) ABSTRACT

Examples described herein include systems and methods for providing a workflow on a user device. A user device can receive image data from a camera of the user device. The device can perform object recognition to recognize an object from the image data, as well as classification of the object. The user device can match the object classification with a backend system. The example method can also include launching a workflow form associated with the matching backend system. The user device can launch a form having these fields available, either within the workflow application or within a dedicated application associated with the relevant backend system. The user device can pre-fill one or more information fields in the workflow form based on the object classification, providing the user with a head start on submitting the form to the appropriate system.

20 Claims, 6 Drawing Sheets

INTELLIGENT WORKFLOWS ON A USER DEVICE

BACKGROUND

In an enterprise setting, employees often tackle a steady flow of projects. These projects can be associated with specific requests or tickets that can be tracked using various systems. Each type of request or ticket can involve a particular workflow for issue resolution, some of which connect with a backend system. For example, if an employee requests information technology ("IT") assistance for an issue with their computer, the workflow for that employee can involve locating and launching an IT application or web page associated with a backend system, creating an IT ticket, and filling in information regarding the computer and the problem being experienced. An IT professional can similarly execute a workflow associated with solving the issue.

These workflows can be time consuming for a user, especially when the user is not accustomed to a particular workflow. For example, a user experiencing a computer issue may not know that an IT application or web page is available. This can lead to additional lost time calling the IT department, asking colleagues, or manually searching through the system. During this time, the user is less productive than desired. Even after locating the appropriate system, the user can still lose valuable time filling in information fields such as their name, position, office location, and device make and model, among other things.

As these non-limiting examples illustrate, even the process of merely discovering available services is itself a problem that causes lost productivity. After discovery is complete, executing those available services to establish a suitable workflow is also inefficient, causing further losses in productivity.

As a result, a need exists for intelligent workflows that leverage technology to assist in the discovery and execution of workflows.

SUMMARY

Examples described herein include systems and methods for providing a workflow on a user device. One example method can include receiving, at the user device, image data obtained from a camera of the user device. The image data can be received in conjunction with a user taking a picture of an object of interest. In some examples, this process can be performed using an application executing on the user device, such as an application configured to assist in creating a workflow for the user. The user can request, through the application, assistance with creating an appropriate workflow.

The example method can also include performing object recognition to recognize an object from the image data. This stage can be performed by using a machine learning model in some examples. In some examples, the user device can compare a suspected object to a library of objects in order to match the object type. In some examples, the user device can recognize text within the image, including text on the object itself, to assist with object recognition. While this stage can be performed on the user device itself, in some examples the user device can send the image data to a remote server that performs the object recognition. The server can then return object recognition information to the user device. In examples where the image data includes multiple potential objects of interest, the user device can prompt the user to choose between these potential objects of interest, such as by selecting them on a display of the user device.

Having recognized the object, the user device can perform a classification of the object in one example. Classification can include identifying a category of objects to which the recognized object belongs. A list of available categories can be stored on the user device. An example category includes employer-owned devices assigned to a user, such as a laptop computer, desktop computer, phone, tablet, scanner, printer, badge, or keycard. In some examples, the user device can request that a remote server assist with classifying an object into one or more classifications.

The example method can further include matching the object classification with a backend system to which the user of the user device is entitled access. A user can be entitled access if the user is authorized to use the backend system in any way, such as by logging into an application or server associated with the backend system or simply being able to submit a request to the backend system, such as by using the systems and methods described herein. In the example method, the user device can compare each available backend system to the classification of the recognized object. In the example of an object classified as an employer-owned device, the user device can match that classification with a backend system directed toward submitting requests to an IT department in charge of maintaining the employer-owned devices. In some examples, the user device can prompt the user to choose between multiple backend systems, particularly when multiple systems could potentially apply to an object of interest.

The example method can also include launching a workflow form associated with the matching backend system. For example, a backend system can have a particular form or format for making a request, such as a form that includes the user's name, position, office location, device type, device ID, and any problems identified by the user. The user device can launch a form having these fields available, either within the workflow application or within a dedicated application associated with the relevant backend system.

As part of the example method, the user device can pre-fill one or more information fields in the workflow form based on the object classification. The user device can pre-fill fields related to the user's information, the object type, the object classification, or any other relevant information obtained by performing the example method. The user device can pre-fill these fields regardless of whether they are displayed within the workflow application or within a backend application associated with the relevant backend system. The user device can then submit the form through to the backend server, initiating a service request.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
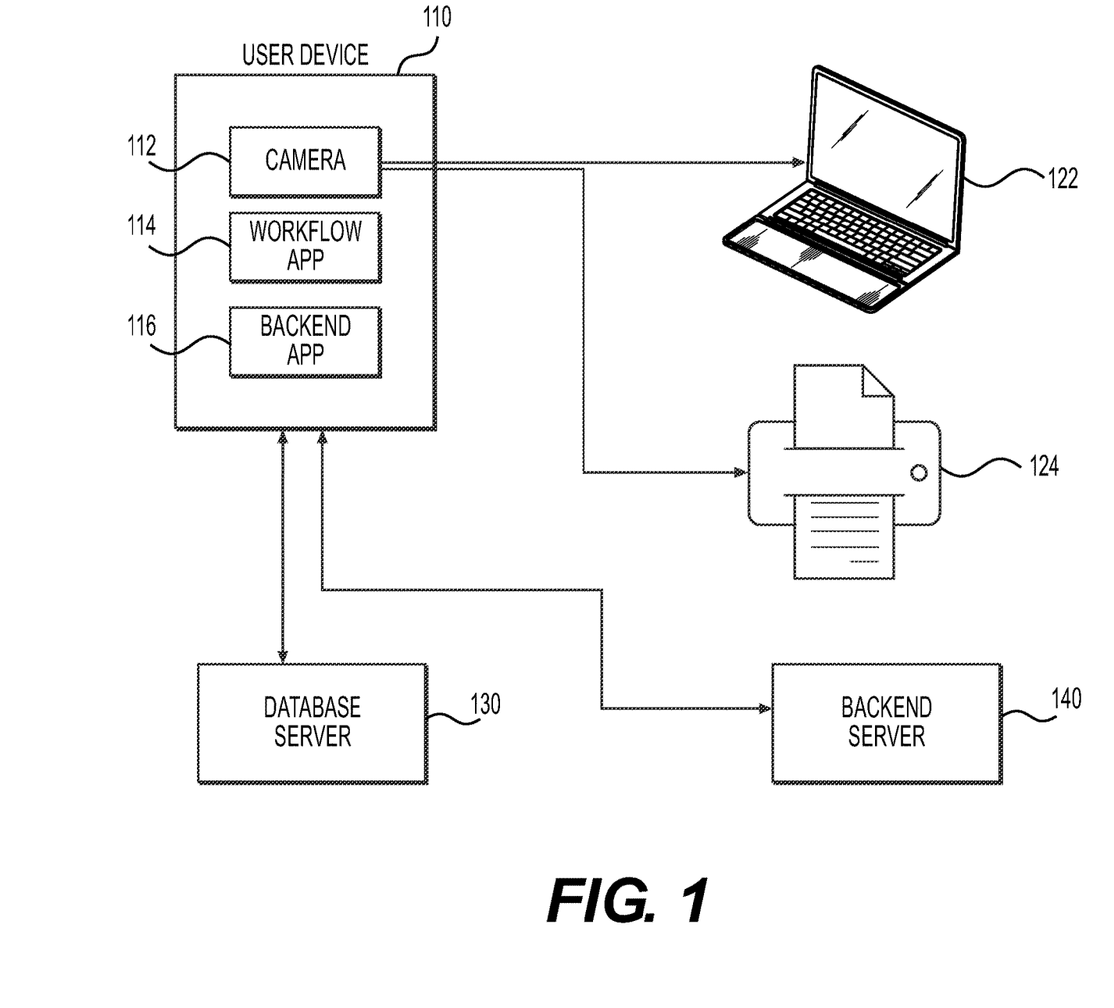
FIG. 1 is an illustration of an example system for providing a workflow on a user device.

FIG. 1 provides an illustration of a system for providing a workflow on a user device. The system can include a user device 110, which can be any device having a hardware-based processor and a memory. The user device 110 can include a display for interacting with the device. It can also include connectivity hardware, such as a radio antenna or wireless communication transmitter. The user device 110 can further include a camera for capturing images. The device 110 can execute an operating system as well as applications installed on the user device 110. Common examples of user devices include phones, tablets, scanners, and laptop or desktop computers.

As shown in FIG. 1, the user device 110 can include at least a camera 112, a workflow application 114, and a backend application 116. The camera 112 can include physical camera hardware as well as accompanying software needed to capture and process an image. For example, the operating system of the user device 110 can include built-in functionality for launching and operating software for use with the camera 112.

The workflow application 114 can be any application that includes functionality for building a workflow. In this sense, a "workflow" can be any series of steps undertaken to complete a task. In the context of a user device 110, a workflow can be any series of actions taken on the user device 110 to complete a task. For example, a user can submit an expense workflow by filling out a form relevant to an accounting system and submitting the form to the appropriate person or department. In some examples, a workflow can include actions taken on different devices, such as drafting an email on a first device and sending the email from a second device. The workflow can also create a trouble ticket. For example, a user device 110 can use the camera 112 to capture an image of a laptop, and the workflow can include creating an IT trouble ticket for the laptop. Alternatively, an image of a conference room can be used to create a workflow for reserving the conference room. These examples regarding workflows are not intended to be limiting in any way.

The workflow application 114 can include functionality for carrying out a workflow. For example, the workflow application 114 can provide a framework for requesting and receiving information necessary for the workflow. This can include providing a field, or a form with multiple fields, corresponding to information required for the workflow. In some examples the user can enter the information in the fields, while in other examples the workflow application 114 can automatically fill the information in the fields. The workflow application 114 can be granted privileges such that it can utilize functionality of the user device 110, such as a storage location, camera 112, and certain operating system commands.

In some examples, the workflow application 114 is a standalone application. In such examples, the workflow application 114 can be launched, either manually by a user or automatically based on a triggering event, and the user can navigate within the workflow application 114 to perform a workflow. For example, the workflow application 114 can display a form relevant to the user's request, pre-fill one or more informational fields within the form, and allow the user to modify or add information in the form. The workflow application can then provide the completed form to a backend application 116, backend server 140, or other relevant destination.

In some examples, the workflow application 114 is part of another application, providing the workflow functionality within that application. In one example, the workflow application 114 is a function within a portal application. The portal application can be an application that provides access to multiple other applications, such as by displaying a catalogue of available applications and using single sign on ("SSO") to provide authentication to an available application selected by the user. In some examples, the portal application can also include management agent capabilities. In some examples, the portal application can include email capabilities. The portal application can include a workflow function that operates similarly to a standalone workflow application. In some examples, the workflow function can be incorporated into a different application, such as an email application. Any application having the workflow functionality can be considered a workflow application 114 for purposes of this disclosure.

The user device 110 can also include one or more backend applications 116. A backend application 116 can correspond to one or more backend systems. Generally speaking, a backend system can be a system that supports an application or functionality, such as in an instance where such support cannot be provided by the user device 110 itself. In some examples, a backend system is a third-party system managed by an entity of which the user is not an employee or member. For example, a project-management system such as JIRA can be considered a backend system. The backend system can be configured to work with a backend application 116 on the user device 110, sending or receiving information to or from the user device 110 through the backend application 116. In the example of JIRA, the backend application 116 can be a JIRA application that allows a user to access functionality of the JIRA backend system.

The system can also include a first device 122 and a second device 124. These devices 122, 124 can each represent an object of interest to the user of the user device 110. For example, the first device 122 can be the user's work laptop while the second device 124 can be a printer for the user's department within an enterprise. These objects are exemplary only, and any other type of object could be considered the first or second device 122, 124. For example, the object could be a chair or a door. Additionally, while only two devices are shown in FIG. 1, the example systems and methods herein can be applied to any number of disparate devices.

The system can further include a database server 130. The database server 130 can be any type of server, or group of servers, that utilize a processor, memory, and storage. In some examples, the database server 130 is a virtualized instance of a server, such as a virtual machine, that utilizes resources of one or more server devices. The database server 130 can store information related to object recognition. This information can include, for example, lists of objects and object types. For example, the database server 130 can store a list of enterprise-owned computing devices that have been assigned to employees. In another example, the database server 130 can store a list of office furniture, such as desks and chairs. In yet another example, the database server 130 can store a list of common-area objects, such as printers, lobby displays, drink machines, and so on. These lists can be further divided by subgroups, including for example employee groups, departments, offices, and floors.

The database server 130 can also include functionality for recognizing an object within an image. For example, the database server 130 can store one or more machine learning models trained to detect objects within an image. In some examples, a machine learning algorithm can be trained using a set of training objects selected by an administrator. For example, the administrator can identify categories of objects to be used for training purposes. In some examples, the administrator can capture images of various objects and provide information about the object, such as classification information, as part of providing the training data. In some examples, the user device 110 can send an image to the database server 130 and request identification and/or classification of objects within the image.

The system of FIG. 1 can also include a backend server 140. The backend server 140 can support a backend system, such as by supporting an application associated with a third-party system. The application can be a web-based application or a backend application 116 installed on the user device 110 as shown in FIG. 1. Although the backend server 140 can support applications associated with third parties, it can also support any backend system in an enterprise, such as an accounting system or project management system, regardless of whether the system is managed by a third party.

The backend server 140 can access information relevant to the backend system, such as a database storing information regarding the backend system. In the example of an accounting backend system, the backend server 140 can access accounting records and forms or other input formats required to input new accounting records. Information available to the backend server 140 can be communicated to the user device 110, such as through the backend application 116. In some examples, the workflow application 114 can communicate with the backend server 140 directly. Applications on the user device 110 can communicate with the backend server 140 by making one or more application programming interface ("API") calls to the server 140, requesting particular information or functionality.

Figure 2:
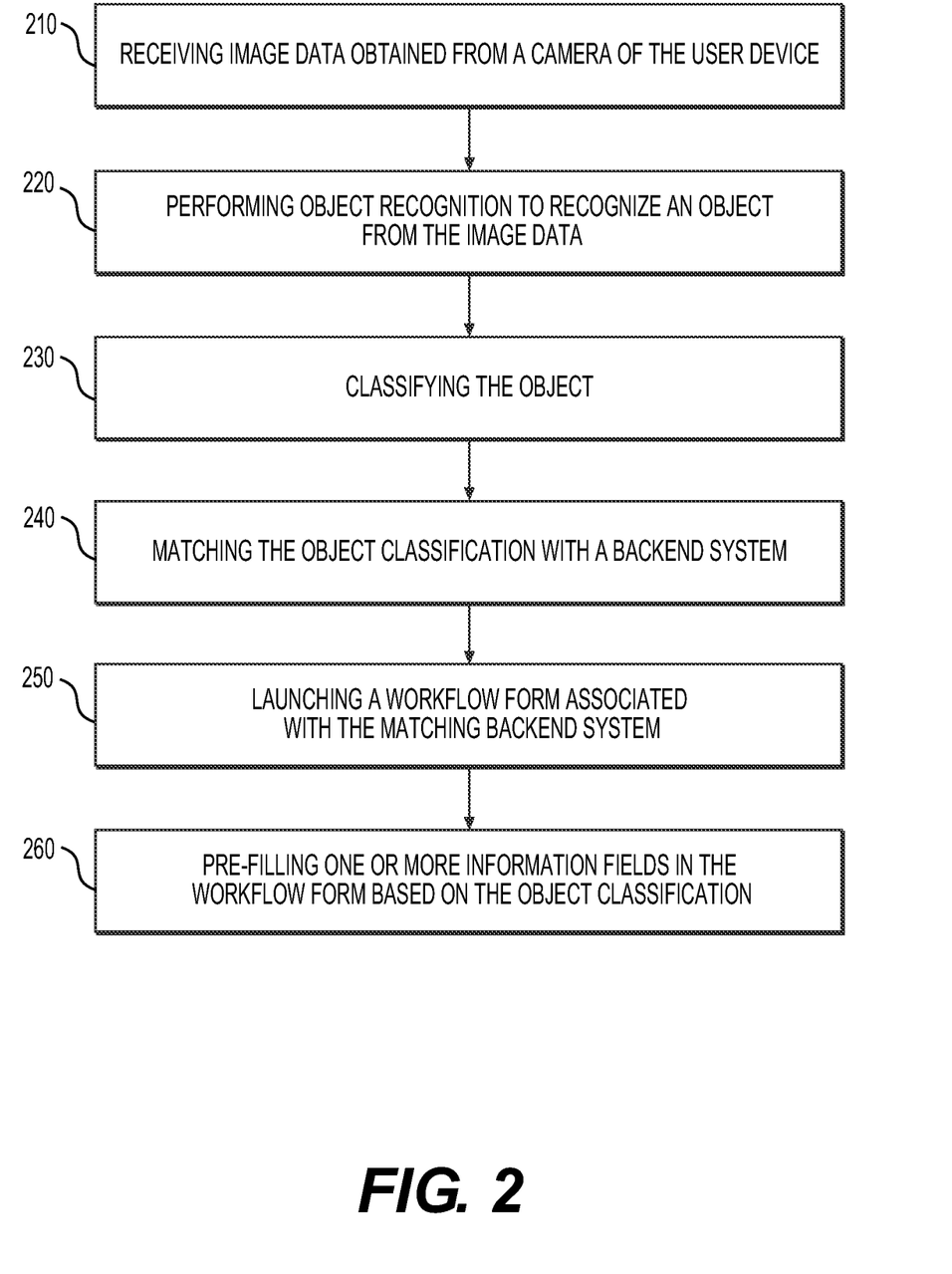
FIG. 2 is a flowchart of an example method for providing a workflow on a user device.

FIG. 2 provides a flowchart of an example method for providing a workflow on a user device 110. The stages of the example method can be performed entirely by the user device 110, entirely by another device such as a server remote from the user device 110, or by using a combination of the user device 110 and another device or server.

Stage 210 of the method can include receiving image data obtained from a camera 112 of the user device 110. In some examples, the image data is an image file stored on the user device 110. In some examples, the image data is based on an image captured by the camera 112. The camera 112 can be operated in conjunction with the workflow application 114, such as within a user interface ("UI") page of the workflow application 114. The image data can also include context information regarding the image, such as the time or location that the image was captured. The context information can further include an identification of the user or user device 110 that captured the image.

Stage 220 of the method can include performing object recognition to recognize an object from the image data. This stage can include processing the image data using one or more machine-learning models, for example. The models can parse the image data, comparing details such as shapes and colors with matching details in a database, in one example. In another example, the models compare the image data with an image of a known object and quantify the differences, repeating this process to discern patterns in the data. In some examples, the user device 110 can store any necessary machine-learning models and apply them to the image data. In other examples, the user device 110 can send the image data to a separate device, such as the database server 130, requesting object recognition. The database server 130 can apply stored machine-learning models to the image data, discern one or more matching objects, and return the result to the user device 110.

Stage 230 can include classifying the object. Classification can include identifying one or more classifications of objects to which a recognized object belongs. For example, if stage 220 results in a determination that an image includes a book, then stage 230 can include identifying a classification for the book. The classification can depend on the types of classes relevant to a particular user, user group, or enterprise. In one example, a book can be classified in a group called "books." In another example, the book can be classified in a group called "written materials." In another example, the book can be classified in a group called "employee property."

Any number of variations can apply depending on the circumstances. In the context of an enterprise, an administrator can establish groups to be used for classification. For example, the administrator can select an option indicating that all books, pamphlets, or paper folders be classified in the "written materials" group, while loose papers are classified according to content contained on the papers. In an example where an object is classified according to content found within text associated with the object, such as text on a page or on a sticker located on a device, then classification can include text recognition. The text recognition can also be performed at stage 220, as part of recognizing the object. In some examples, a recognized object can be classified into multiple groups.

In some examples, tags are used to classify objects, services, or requests relevant to a user. A tag can act as a shortcut, providing useful information to assist in classifying an object. For example, when a mobile device is assigned to an employee, a tag can be created for the service provider associated with that mobile device (e.g., VERIZON, AT&T). The tag can be an object stored at the user device 110 or at a server such as the database server 130. The tag can include information identifying the mobile device and the associated service provider. This tag can be referenced at any stage of the method and can provide useful information for creating a workflow. Other example tags can include a device manufacturer and device model number. In some examples, objects can be tagged based on their location. For example, objects within a particular office location (e.g., furniture, offices, conference rooms) can be tagged with an indication of the office location (e.g., Dallas).

In some examples, a feedback loop can be used to recognize new tags. For example, if a user repeatedly enters the same information about an object into a workflow process, the system can recognize this pattern and automatically create a tag containing that information and associated with the object. In another example, the system can suggest a tag as part of filling in a workflow for a user and note when the user deletes the tag or changes it, indicating that the tag is incorrect or not desired for that object.

In some examples, an administrator can add custom tags to objects. For example, the administrator can scan a sticker on a user's laptop, with the sticker having a bar code or other identifier that is associated with a laptop. The administrator can then add a tag to the object, such as a note regarding device maintenance performed by the administrator (e.g., "maintenance performed on Feb. 28, 2020" and/or "operating system reloaded Feb. 28, 2020"). In the future, another administrator can view this tag when an autoworkflow process involves the same laptop. This process can be performed for any type of object and using any information.

In some examples, the tag can include context data. Using the previous example, the context data can include the text "maintenance performed on Feb. 28, 2020" and/or "operating system reloaded Feb. 28, 2020." In some examples, an administrator can view context data for an object recognized within an image. For example, the administrator can capture an image of a laptop, and the administrator's device can display the context data overlaid on the image, informing the administrator of the previous maintenance work. This can allow the administrator to quickly obtain information about an object from the image of the object. The context data can be shown as part of the example methods of FIGS. 2 and 3, for example, or as a standalone feature such as an administrator tool.

Stage 230 can be performed at the user device 110 in some examples. The user device 110 can perform classification even if another device, such as the database server 130, performed the object recognition. In such examples, the user device 110 can receive information identifying the object and then classify the object based on that information. In other examples, another device such as the database server 130 can perform both the object recognition and classification, in which case the user device 110 can receive the classification from the database server 130.

Stage 240 can include matching the object classification with a backend system. In some examples, each backend system can be associated with one or more object classifications. In an example such as the example of a backend accounting system providing accounting services, the object classifications of "invoices," "payment," and "expense reports" can be associated with the system. In such an example, if the user takes a photograph of a payment check from a customer, the object can be recognized as a check at stage 220, classified as "payment" in stage 230, and at stage 240 the check can be associated with the backend accounting system.

In some examples, an object can be associated with multiple backend systems, regardless of how many groups into which the object is classified. For example, the user can capture an image of an email printed on a piece of paper, where the email includes information about expenses that need to be submitted to the accounting department. The paper can be classified into categories including "email" and "expense reports." In this example, the "email" classification can correspond to an email system, while the "expense reports" classification can correspond to an accounting system.

In another example, a single classification of an object can correspond to multiple backend systems. For example, a paper with expense information can be classified into categories include "expense reports," where such classification corresponds to an accounting system as well as a specialized expense reporting system. In examples where multiple backend systems can apply to an object, the user device 110 can prompt the user to select an appropriate backend system. In some examples, a machine-learning algorithm is applied to select the appropriate backend system, such as by considering historical choices by the user. If the user only uses one of two potential backend systems, for example, the method can include choosing the more-used system without requiring user intervention.

Stage 250 can include launching a workflow form associated with the matching backend system. Launching a workflow can include launching a UI page within the workflow application 114 in one example. The UI page can identify the relevant backend system selected in some examples. The UI page can also include a form, which can be a collection of informational elements. For example, a form can include a blank text field and a radio button with options for "yes" and "no."

In another example, a form includes multiple text fields. Although the UI page can be displayed within the workflow application 114 in some examples, in other examples the UI page can be displayed in another application. For example, stage 250 can include causing the user device 110 to launch a backend application 116 relevant to the backend system matched at stage 240. In another example, stage 250 can include causing the user device 110 to launch a browser application and navigate the browser application to a particular web location that includes the relevant form.

Stage 260, which can be performed in conjunction with stage 250, can include pre-filling one or more information fields in the workflow form. In this context, "pre-filled" can refer to filling in information before the user has an opportunity to provide that same information. For example, the form displayed at stage 250 can be displayed with one or more fields already containing relevant information. The pre-filled fields can be filled based on the text recognition with the image, the recognized object, the object classification, the matched backend system, or any combination thereof.

In an example where a user captures an image of a meal receipt, the method can include recognizing the object as a receipt at stage 230, classifying the object into an "expense report" group at stage 230, matching the object with an backend expense system directed to submitting and approving business expenses at stage 240, launching a form within the workflow application 114 at stage 250, and then pre-filling an expense field of the form with the total amount on the receipt as part of stage 260. Stage 260 can also include identifying the expense as a meal, such as by filling a field with the word "meal" or by selecting "meal" from a drop-down menu or other selection element. The user can then complete any remaining fields before submitting the form to the backend system for processing.

Figure 3:
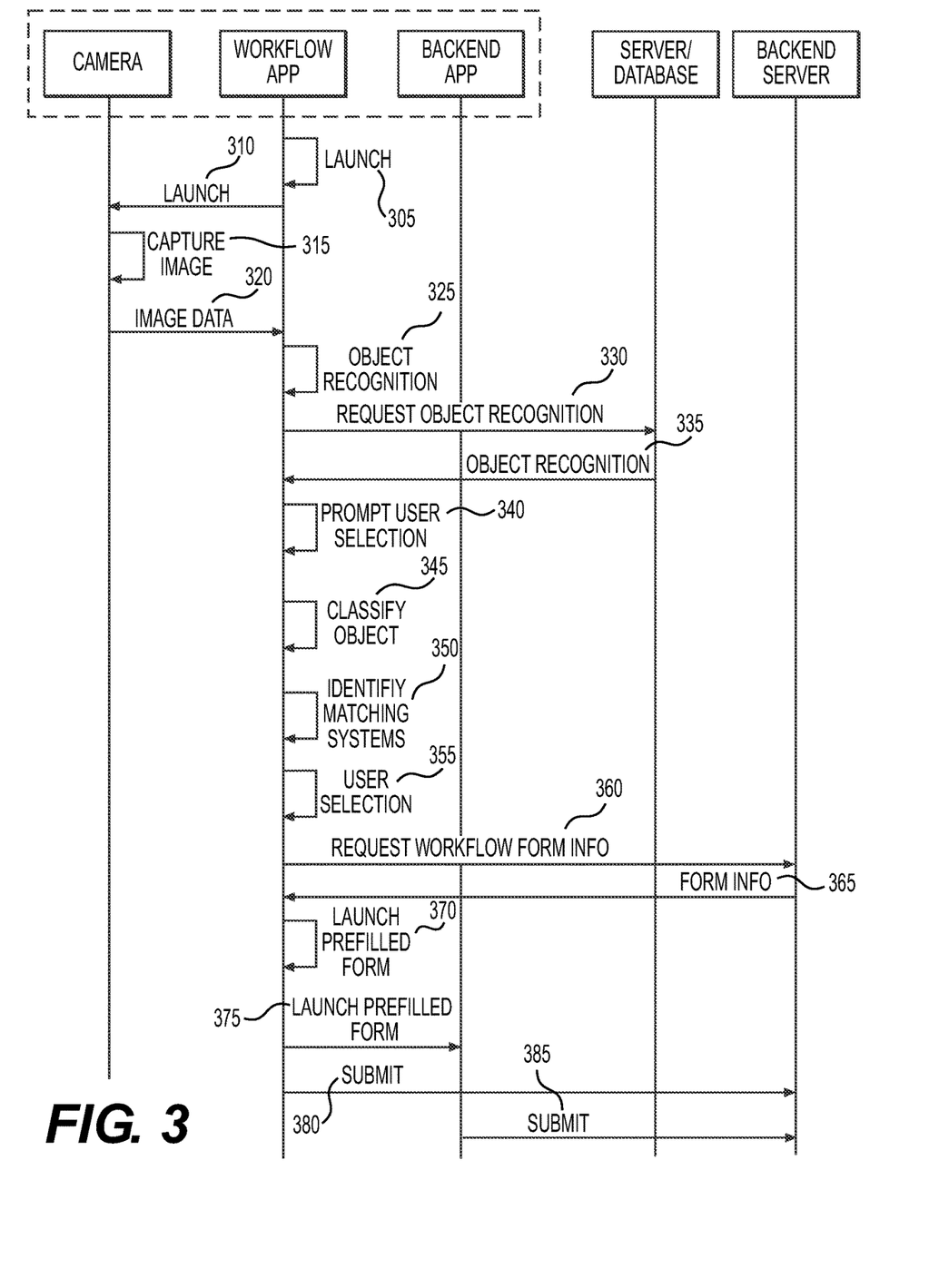
FIG. 3 is a sequence diagram of an example method for providing a workflow on a user device.

FIG. 3 provides a sequence diagram of an example method for providing a workflow on a user device 110. At stage 305, the user can launch the workflow application 114 on the user device 110. This can involve selecting the workflow application 114 from a home screen of the user device 110 or from a catalogue of applications displayed in a portal application, for example. In some examples, launching the workflow application 114 includes selecting a workflow function within an application that provides various functionality. For example, a portal application can have a workflow function that, when selected by the user, launches a workflow portion of the application.

Figure 4A:
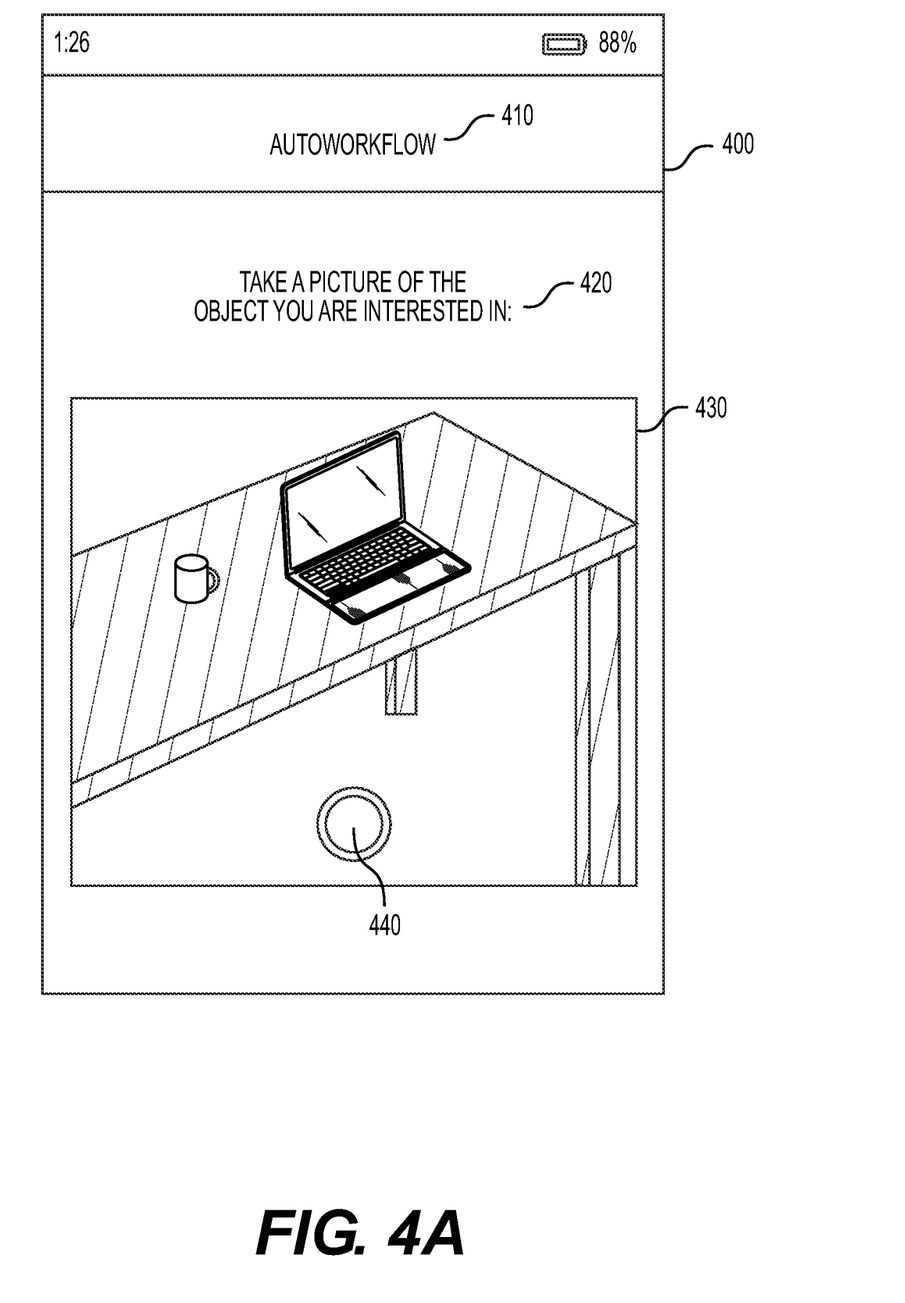
FIG. 4A is an illustration of an example graphical user interface ("GUI") of a user device for performing various methods described herein.

At stage 310, the workflow application 114 can launch a camera 112 interface. In some examples, the camera 112 interface is the same interface used to take a picture or record a video on the user device 110. For example, the workflow application 114 can request that the operating system of the user device 110 launch the camera 112 interface. In another example, a camera 112 interface is launched within the workflow application 114. This can include displaying a UI page within the workflow application 114 where a portion of the UI page is dedicated to the camera 112. This portion of the UI page can function as the standalone camera 112 interface would function, such as by showing a live picture and providing a button to capture an image, as shown in FIG. 4A.

At stage 315, the user can capture an image using the camera 112 interface. This stage can include orienting the user device 110 such that the camera 112 faces an object of interest and selecting an element to capture the image. As explained above, this can be performed from within the workflow application 114 or from within a standalone camera 112 interface, in some examples. The camera 112 can provide the image data to the workflow application 114 at stage 320, such as by saving the image to a storage location accessible to the workflow application 114.

At stage 325, the workflow application 114 can perform object recognition using the image data received at stage 320. Performing object recognition can include processing the image data using one or more machine-learning models, for example. The models can parse the image data, comparing details such as shapes and colors with matching details in a database, in one example. In another example, the models compare the image data with an image of a known object and quantify the differences, repeating this process to discern patterns in the data. In some examples, the user device 110 can store any necessary machine-learning models and apply them to the image data. The models can be trained elsewhere, such as at a remote server, and the trained models can be transmitted to the user device 110.

In some examples, object recognition can include utilizing optical character recognition ("OCR"). This process, described in more detail with respect to stage 345, can recognize text characters on an object, such as a product tag or sticker, to assist in performing object recognition. Stage 325 can also include considering one or more environmental factors. For example, the system can consider inputs such as a network name or type that the user device 110 is connected to, the location of the user device 110, and the date and time that the image was captured. The environmental factors can provide additional insight, such as by allowing the system to weight potential objects or object types as more likely than others. For example, if the user device 110 location is not in or near an enterprise office location, then the system can infer that the image does not include a stationary office object such as an office desk, office chair, or conference room.

While stage 325 depicts the workflow application 114 as performing the object recognition, other software on the user device 110 can optionally perform some or all of the object recognition procedure. In some examples, the operating system of the user device 110 includes functionality for running machine-learning models. In another example, the user device 110 includes a separate application or software module that can execute the machine-learning models.

In some examples, the user device 110 can optionally request object recognition from a remote server at stage 330. This stage can be performed instead of stage 325 in some examples. In another example, stage 330 is performed in response to a failure to recognize an object at stage 325. In the example of FIG. 3, the workflow application 114 requests object recognition from a server, such as the database server 130 of FIG. 1. This can allow for the use of more computationally complex machine-learning models, which can utilize the additional resources available to a server versus the user device 110. The server can train the machine-learning models from training data in some examples, though in other examples the server receives the trained models and applies them to a request at stage 330. The results of the object recognition can be provided back to the user device at stage 335.

In some examples, multiple objects can be recognized within a single image. In such examples, the method of FIG. 3 can include, at stage 340, prompting the user to select between the multiple objects. This can include displaying an annotated version of the image captured at stage 315, such as a version that includes boxes around the potential objects of interest. In some examples, the annotated image can gray-out portions of the image that do not include a potential object, leaving the portions with the potential objects remaining. The user can then select one or more of the various objects, as described in more detail with respect to FIG. 4B.

At stage 345, the workflow application 114 can classify the recognized object. This stage can include identifying a category of objects to which the recognized object can apply. The workflow application 114 can apply machine-learning models to this stage as well, which can take into account various types of information to inform the classification. For example, the models can use, as input, the user's name or ID, position in the enterprise, physical location, time of day, day of the week, open requests in a project tracking database, emails in the user's inbox requesting information about an object, or any other relevant information.

For example, if the user typically submits expenses on Friday morning and receives an email requesting those expenses at noon on Friday, the system can determine that the user likely still needs to submit the expenses. In that example, if the user takes a picture of a receipt for object recognition, the system can determine that the receipt is likely related to the expenses requested in the email. As a result, the workflow application can classify the object as an "expense." In some examples, a recognized object can be classified into multiple different categories.

Stage 345 can include utilizing text recognition, including OCR. OCR can include recognizing text within an image, such as text on a product sticker or a piece of paper. It can also include recognizing the characters within the text, including numbers, letters, or other characters. The OCR process can use pre-processing stages such as de-skewing, de-speckling, binarization, line removal, layout analysis, segmentation, and normalization of scale and aspect, for example. It can also include an algorithm that performs (1) matrix matching, including comparing an image to a stored glyph on a pixel-by-pixel basis, (2) feature extraction, which decomposes glyphs into features such as lines, loops, and intersections to compare with an abstract representation of a character, and (3) adaptive recognition, which uses letter shapes recognized with high confidence on the first pass to recognize better the remaining letters on the second pass. These algorithms can be performed by the user device 110 in some examples, but in other examples can be performed remotely by a server, such as the database server 130.

Stage 345 can also include considering one or more environmental factors. For example, the system can consider inputs such as a network name or type that the user device 110 is connected to, the location of the user device 110, and the date and time that the image was captured. The environmental factors can provide additional insight, such as by allowing the system to weight potential objects or object types as more likely than others. For example, if the user device 110 location is not in or near an enterprise office location, then the system can infer that the image does not include a stationary office object such as an office desk, office chair, or conference room.

In some examples, the classification at stage 345 can be performed based on one or more tags associated with an object. In one example, an object is associated with a tag based on a previous interaction with that object, such as a maintenance ticket submitted for a malfunctioning office chair. As a result of that previous interaction, the office chair can be tagged as office furniture, for example. In the future, if the user takes an image of the same type of office chair, that chair can also be tagged as office furniture. This can assist with object classification and minimize computational loads.

At stage 350, the workflow application 114 can identify one or more backend system that match, or relate to, the classification determined at stage 345. Continuing the example regarding Friday expenses, at this stage the workflow application 114 can compare the classification of "expense" to available backend systems. In some examples, the user device 110 includes a table with available backend systems and relevant classification types for each of those systems. "Expense" can be included in the table as relevant to an expense tracking system as well as an accounting system, for example.

Stage 350 can also include the use of machine learning to assist in selecting an appropriate backend system. For example, if the user submits expenses every Friday using a particular expense tracking system, then a machine-learning model using that information as an input can determine that the user most likely intends to submit the expense through that same expense tracking system. In addition to these types of historical patterns, the model can also parse relevant emails to determine whether they indicate a backend system. In the previous example, the email received by the user can request that expenses are submitted using a new system. The machine-learning model can utilize this information to determine that the intent is to bypass the more commonly used system and instead use a new system. In that example, stage 350 can include identifying that new system as a matching backend system.

In some examples, stage 350 can identify more than one potentially matching backend system. In those examples, at stage 355, the workflow application 114 can prompt the user to select between the multiple identified backend systems. For example, the workflow application 114 can display a UI element asking the user to select a system, with text or images displayed below and corresponding to each potential system. The user can select a system by selecting the appropriate image or by another method, such as checking a box or utilizing a drop-down menu.

In examples where only one backend system is identified at stage 350, stage 355 can be used as confirmation from the user that the selected backend system is correct. This can be performed by prompting the user for confirmation, such as by asking the user if they would like to use the identified backend system and allowing the user to select a "yes" or "no" button. In some examples, the user can enter information to select a different backend system. This can be helpful for instances where the machine-learning models are not returning correct results for the user. The models can be updated when a user selects a different system, providing a feedback mechanism that can improve the models over time.

At stage 360, the workflow application 114 can request workflow form information from a relevant backend server 116 and receive the information from the backend server 116 at stage 365. This can include requesting and receiving a file that is itself a form, in some examples. In other examples this stage includes receiving information identifying the fields required by the backend server 116. This can allow the workflow application 114 to present the fields to the user in a format determined by the workflow application 114. For example, the backend server 116 can indicate that the it requires an employee ID, a job number, an expense type, and an expense amount. In examples where the backend server 116 supplies the form itself, rather than information regarding the individual required fields, the workflow application 114 can parse the form using text recognition and determine the required fields in that manner.

In one example, at stage 365 the backend server can provide values for pre-filling some of the fields. For example, a laptop may have sticker on it with a part ID, and that part ID can be used by the backend server to identify other associated information such as laptop build type, that can be included in the form.

At stage 370, the workflow application 114 can launch a pre-filled form. This can include presenting one or more of the fields identified by the backend server 116 or determined by the workflow application 114. In some examples, the workflow application 114 presents these fields in a different order or different format than what was provided by the backend server 116. In this sense the "form" displayed at stage 370 is not necessarily a form recognized by the backend server 116.

As part of stage 370, the workflow application 116 can pre-fill one or more fields displayed to the user. For example, the workflow application 116 can fill in an employee ID based on information stored at the user device 110 or from information obtained from a remote server, such as a management server that exercises management control over the user device 110. As another example, the workflow application 116 can fill in an expense amount based on text recognized from the image, such as a total dollar amount on the receipt. These fields can be considered "pre-filled" in the sense that the user is not required to manually fill them after the fields are displayed. In some examples, the pre-filled fields can be hidden while the fields requiring user input can be displayed. The user can submit the form through the workflow application 114 to the backend server 140 at stage 380.

In some examples, the form launched at stage 370 is alternatively launched within a backend application 116 installed on the user device 110. Continuing the receipt example, if the user device 110 includes a backend application 116 corresponding to the appropriate expense-reporting backend system, the user device 110 can launch that backend application 116 at stage 375. This stage can further include providing information to the backend application 116 sufficient to pre-fill one or more required fields. In some examples, the backend application 116 can be configured to receive such input from an external source, such as the workflow application 114. This can assist with providing information accessible to the workflow application 114 but not to the backend application 116, such as an employee ID. The user can then submit the form through the backend application 116 to the backend server 140 at stage 385.

Figure 4B:
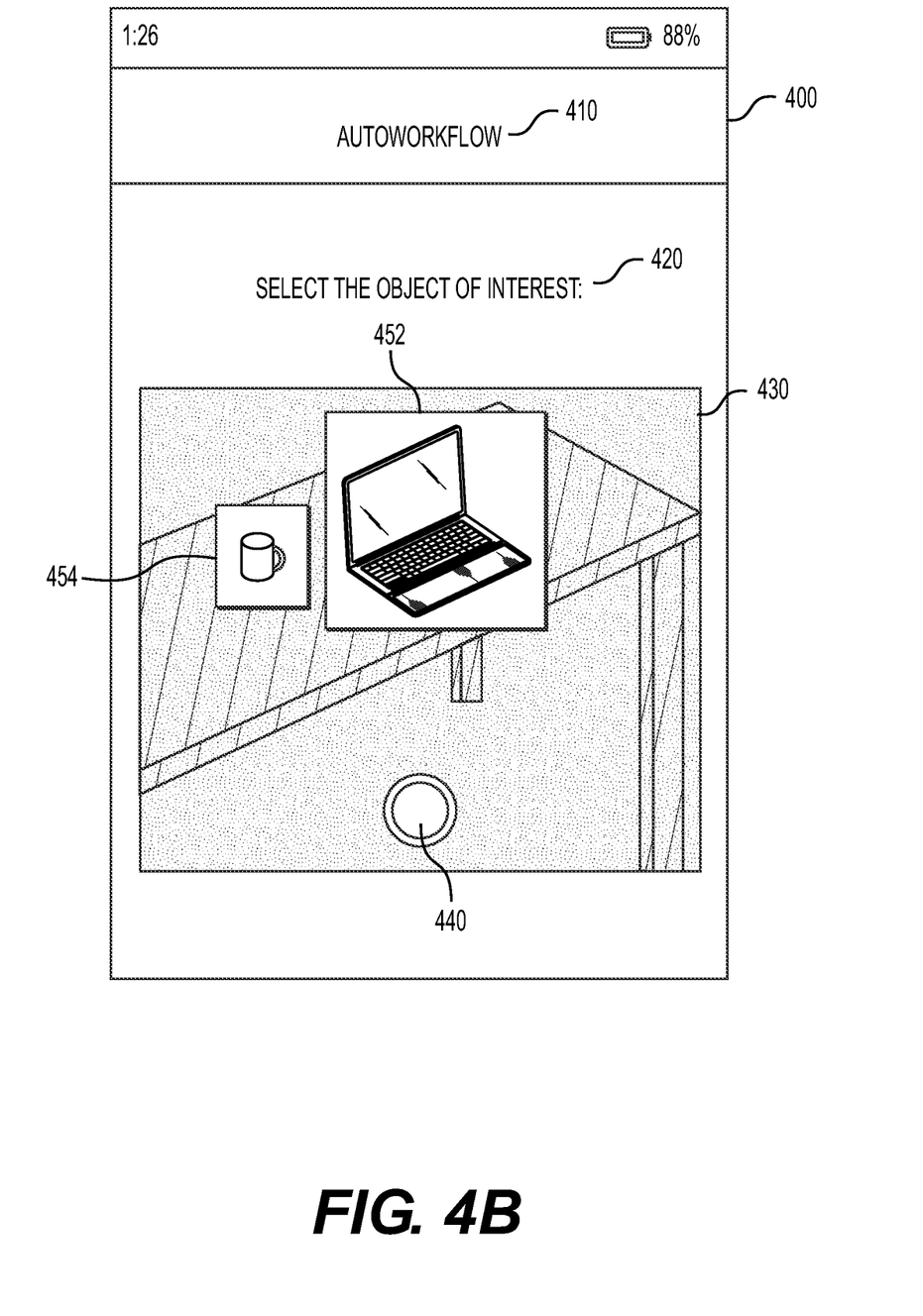
FIG. 4B is an illustration of an example graphical user interface ("GUI") of a user device for performing various methods described herein.
Figure 4C:
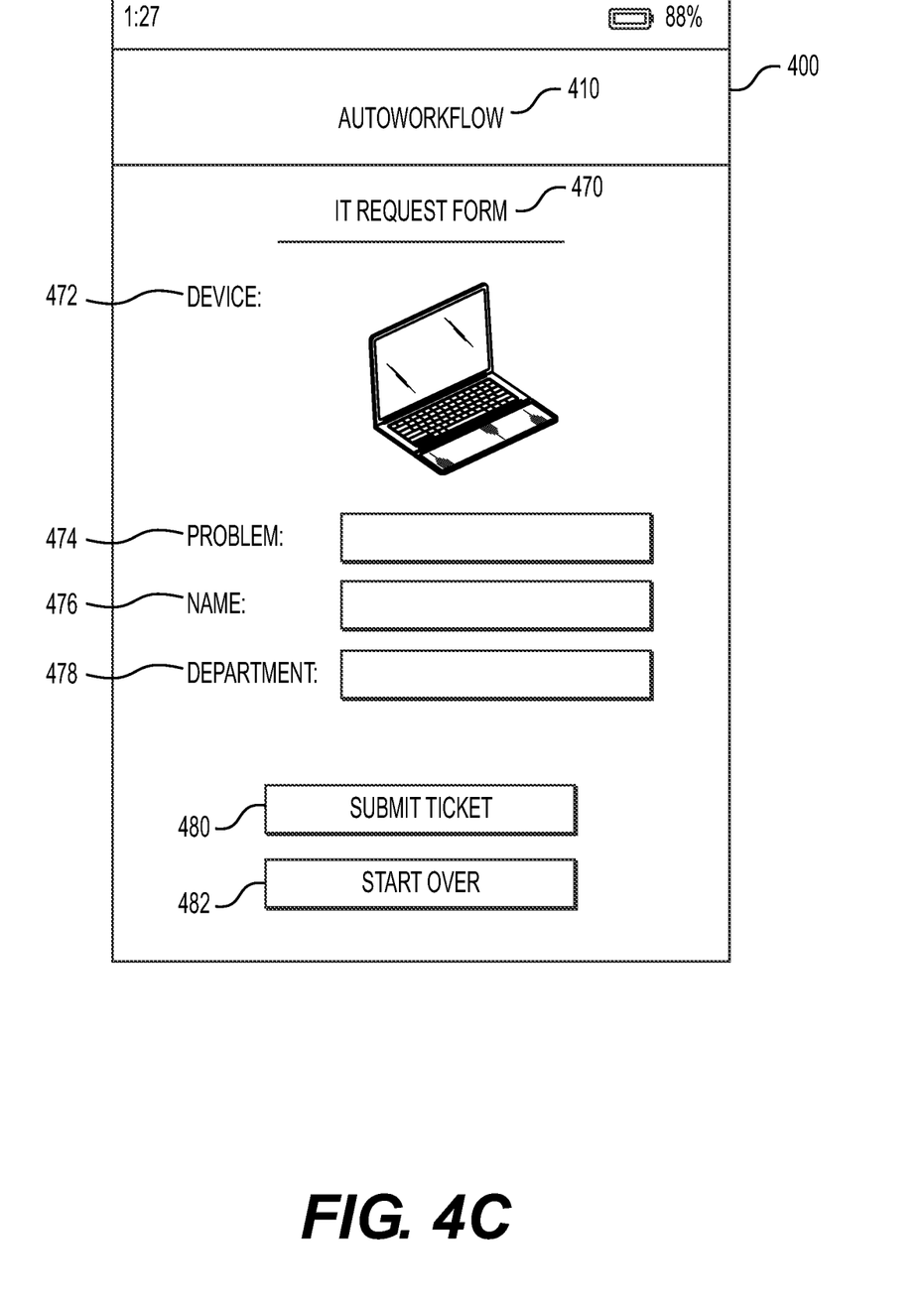
FIG. 4C is an illustration of an example graphical user interface ("GUI") of a user device for performing various methods described herein.

FIGS. 4A-4C provide illustrations of example GUIs of a user device 110 for performing the various methods described herein. For example, FIG. 4A includes a GUI 400 of a workflow application 114, such as the workflow application 114 described above with respect to FIGS. 1-3. In this example, the workflow application 114 is called "Autoworkflow." The title of the application is displayed in a title portion 410 in this example. In other examples, the title portion 410 can include an identification of a different application, or a function within an application. In some examples, the title portion 410 includes instructions or a message to the user regarding utilizing the autoworkflow application.

The GUI 400 of FIG. 4A also includes an instruction portion 420. This portion can be any portion of the GUI 400 that includes instructions for utilizing the GUI 400. In the example of FIG. 4A, the instruction portion 420 includes an instruction for the user to take a picture of the object they are interested in. In some examples, the instruction portion 420 is presented as a pop-up window that the user must acknowledge in order to proceed to the next stage of an example method. In other examples, the instruction portion 420 is available to the user by selecting a graphical element, such as a lowercase "i" with a circle around it to signify that additional information is available.

The GUI 400 can also include an image-capture portion 430. In some examples, such as the one shown in FIG. 4A, the image-capture portion 430 is provided on the same GUI page as the instruction portion 420. The image-capture portion 430 can be contained within a box as shown in FIG. 4A. The image-capture portion 430 can provide a live feed from the camera 112 of the user device 110. It can also include a button element 440 for capturing an image displayed in the image-capture portion 430. In the example of FIG. 4A, the image-capture portion 430 is displaying a table with a laptop and a cup resting on the table. The user can capture this image by selecting the button element 440.

In some examples, the image-capture portion 430 includes options for zooming, selecting between camera lenses or modes, editing, or any other options provided for image capture by the operating system of the user device 110. In some examples, the image-capture portion 430 can be launched into a full-screen version, such as by selecting a button on the GUI 400. In some examples, a user can opt to use the image-capture portion 430 shown in FIG. 4A, with an additional option displayed on the GUI 400 that, when selected, causes the image-capture portion 430 to be launched into a full-screen version.

The user can capture the image using the button element 440 shown. In some examples, after selecting the button element 440, the user can elect to retake the picture before continuing the process. This can be useful in situations where the object of interest is not captured properly, such as where the user device 110 is moving or a user's finger obscures the image. The GUI 400 can display an option to keep the image or discard it, for example, before continuing.

FIG. 4B provides another example view of the GUI 400 of FIG. 4A. In this example view, the user has captured an image using the button element 440. The user device 110 has processed the image, such as by using the steps provided in the example method of FIG. 3 and has determined that the image includes multiple potential objects of interest. As explained at stage 340 of FIG. 3, the system can query the user for additional information to select from between multiple objects.

In this example, the user device 110 has recognized two potential objects of interest: a laptop and a cup. The GUI 400 therefore includes an image-capture portion 430 showing the captured image with two boxes 452, 454, one associated with each of the potential objects of interest. The remaining portions of the image have been grayed out in this example, to highlight the objects of interest. Additionally, the instruction portion 420 of the GUI 400 has been updated to instruct the user to select the object of interest from the available objects highlighted below. The user can simply select the first box 452 or the second box 454 to indicate which object is the object of interest. In some examples, the GUI 400 can include a cancel button that allows the user to back out of the workflow and, for example, capture another image using the same process.

FIG. 4C includes an example view of the GUI 400 of FIGS. 4A and 4B after the user has selected an object of interest and a backend system has been identified, as explained at stages 350-365 of FIG. 3. In some examples, the user can also be prompted to select from between multiple backend systems, as explained with respect to stage 355 of FIG. 3. After the backend system has been identified, the GUI 400 can display a form, as shown in FIG. 4C and described at stages 370 and 375 of FIG. 3.

In this example, the user device 110 has identified a backend system related to IT based on the user selecting the laptop image 452 as shown in FIG. 4B. The workflow application 114 has selected the IT backend system in this example, displaying an IT request form 470 on the GUI 400. The IT request form 470 includes various fields 472-482 that can be obtained from the IT backend system in an example. In another example, the user device 110 stores the fields 472-482 relevant to the IT backend system.

Additionally, as shown in FIG. 4C, the device field 472 has been pre-filled by the user device 110. For example, the device field 472 includes an image of the object of interest as well as a classification of that object as a "laptop." In this example, the IT request form 470 also includes a problem field 474, a name field 476, and a department field 478. Although not shown here, the user device 110 can pre-fill some of all of these additional fields. For example, the user device 110 can access records associated with the user to determine the user's name and department within the organization, using that information to pre-fill the name field 476 and the department field 478. In that example, the user can fill in the "problem" field describing the issue the user is experiencing with the laptop.

Once the form 470 is complete, the user can submit a ticket to the IT department (or other relevant backend system, in other examples utilizing different objects or different backend systems) by selecting the submit button 480. Alternatively, the user can cancel or start over by selecting the button 482 labelled accordingly. FIGS. 4A-4C walk through only a single example using a single backend system, but the same overall layouts and functionality can be applied to multiple different examples utilizing multiple objects and backend systems, as well as different backend systems than described here.

In addition to the examples described above, the disclosed systems and methods can be used to provide an administrator mode that provides visibility into various issues at the same time. For example, as explained with respect to stage 220 of FIG. 2, an administrator can add custom tags for objects, such as an object that is the subject of a ticket submitted by a user. In the future, another administrator can view this tag when an autoworkflow process involves the same object. In some examples, the tag can include context data. Using the previous example, the context data can include the text "maintenance performed on Feb. 28, 2020" and/or "operating system reloaded Feb. 28, 2020." In some examples, an administrator can view context data for an object recognized within an image.

In addition to viewing the context data in association with a single object, as described above, an administrator can also view context data in an administrator mode. An administrator mode can provide, for example, a visual representation of an entire office, floor, or department. The visual representation can be a virtual floorplan, for example. Information can be presented through this view such that an administrator can quickly identify requests and associated statuses.

For example, the virtual floorplan can include icons associated with each open request or issue. This can include requests for peripherals, such as a new keyboard or mouse, or open IT issues such as a nonresponsive computer or an email synchronization issue. These various items can be color coded based on urgency or severity in some examples. Each item can be selected to view more information, including the image associated with the item. This can allow an IT administrator to open the virtual floorplan view, quickly identify the problematic issues based on the color coding, and then view relevant information by selecting the icon. The floorplan aspect can also allow an IT professional who is unfamiliar with an office to quickly locate a problem or object within a large office.

In some examples, the virtual floorplan can be utilized by a drone. For example, if a user has requested a new computer mouse, this information can be provided through the virtual floorplan to a small office drone. The drone can navigate the office based on the floorplan and drop off the requested computer mouse at the desk nearest the associated icon on the virtual floorplan. The drone can also log new issues by arriving at a location, capturing images, and utilizing the workflow processes described above.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing a workflow on a user device, comprising:
   receiving, at the user device, image data obtained from a camera of the user device;
   performing object recognition to recognize an object from the image data;
   classifying the object;
   matching the object classification with a backend system to which the user of the user device is entitled access;
   launching a workflow form associated with the matching backend system; and
   pre-filling one or more information fields in the workflow form based on the object classification.

2. The method of claim 1, wherein launching the workflow form comprises launching an application associated with the matching backend system and providing an authentication token associated with the user.

3. The method of claim 1, wherein performing object recognition comprises using optical character recognition (OCR) to recognize text within the image data.

4. The method of claim 1, wherein the image data is obtained in response to the user launching a workflow option from an application executing on the user device.

5. The method of claim 1, further comprising prompting the user to select the object from a plurality of objects in the image data.

6. The method of claim 1, further comprising displaying the image data on the user device with context data overlaid on the image data.

7. The method of claim 1, wherein pre-filling the form includes:
   filling a first field with first information from the backend system; and
   filling a second field by the user device based on text recognized within the image data.

8. A non-transitory, computer-readable medium containing instructions that, when executed by a hardware-based processor of a user device, performs stages for providing a workflow on the user device, the stages comprising:
   receiving, at the user device, image data obtained from a camera of the user device;
   performing object recognition to recognize an object from the image data;
   classifying the object;
   matching the object classification with a backend system to which the user of the user device is entitled access;
   launching a workflow form associated with the matching backend system; and
   pre-filling one or more information fields in the workflow form based on the object classification.

9. The non-transitory, computer-readable medium of claim 8, wherein launching the workflow form comprises launching an application associated with the matching backend system and providing an authentication token associated with the user.

10. The non-transitory, computer-readable medium of claim 8, wherein performing object recognition comprises using optical character recognition (OCR) to recognize text within the image data.

11. The non-transitory, computer-readable medium of claim 8, wherein the image data is obtained in response to the user launching a workflow option from an application executing on the user device.

12. The non-transitory, computer-readable medium of claim 8, the stages further comprising prompting the user to select the object from a plurality of objects in the image data.

13. The non-transitory, computer-readable medium of claim 8, the stages further comprising displaying the image data on the user device with context data overlaid on the image data.

14. The non-transitory, computer-readable medium of claim 8, wherein pre-filling the form includes:
   filling a first field with first information from the backend system; and
   filling a second field by the user device based on text recognized within the image data.

15. A system for providing a workflow on a user device, comprising:
   a memory storage including a non-transitory, computer-readable medium comprising instructions; and
   the user device, including a hardware-based processor that executes the instructions to carry out stages comprising:

receiving, at the user device, image data obtained from a camera of the user device;

performing object recognition to recognize an object from the image data;

classifying the object;

matching the object classification with a backend system to which the user of the user device is entitled access;

launching a workflow form associated with the matching backend system; and pre-filling one or more information fields in the workflow form based on the object classification.

16. The system of claim 15, wherein launching the workflow form comprises launching an application associated with the matching backend system and providing an authentication token associated with the user.

17. The system of claim 15, wherein performing object recognition comprises using optical character recognition (OCR) to recognize text within the image data.

18. The system of claim 15, wherein the image data is obtained in response to the user launching a workflow option from an application executing on the user device.

19. The system of claim 15, the stages further comprising prompting the user to select the object from a plurality of objects in the image data.

20. The system of claim 15, the stages further comprising displaying the image data on the user device with context data overlaid on the image data.

* * * * *